United States Patent
Colson et al.

(10) Patent No.: US 7,100,666 B2
(45) Date of Patent: Sep. 5, 2006

(54) TUBULAR SLAT FOR COVERING FOR ARCHITECTURAL OPENINGS

(75) Inventors: Wendell B. Colson, Weston, MA (US); James M. Anthony, Denver, CO (US); Paul G. Swiszcz, Boulder, CO (US); Jason T. Throne, Steamboat Springs, CO (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 74 days.

(21) Appl. No.: 10/332,411

(22) PCT Filed: Jul. 16, 2001

(86) PCT No.: PCT/US01/22336

§ 371 (c)(1),
(2), (4) Date: Jan. 7, 2003

(87) PCT Pub. No.: WO02/06619

PCT Pub. Date: Jan. 24, 2002

(65) Prior Publication Data

US 2003/0205339 A1 Nov. 6, 2003

Related U.S. Application Data

(60) Provisional application No. 60/219,039, filed on Jul. 18, 2000.

(51) Int. Cl.
*E06B 9/386* (2006.01)

(52) U.S. Cl. .................... 160/236; 160/173 R; 160/900

(58) Field of Classification Search ................ 160/236, 160/173 R, 900, 232, 84.05, 235, 173 V, 160/405, 168.1 R, 176.1 R, 168.1 V, 176.1 V, 160/178.1 R See application file for complete search history.

(56) References Cited

U.S. PATENT DOCUMENTS

| | | | | |
|---|---|---|---|---|
| 1,952,739 A | | 3/1934 | Weisfeld | 156/17 |
| 2,105,082 A | | 1/1938 | Johnson | 156/17 |
| 2,116,357 A | | 5/1938 | Laborda et al. | 156/17 |
| 2,169,873 A | | 8/1939 | Clark, Jr. | 156/17 |
| 2,218,508 A | | 10/1940 | Gentile | 156/17 |
| 2,244,094 A | | 6/1941 | Wread | 156/17 |
| 2,326,454 A | | 8/1943 | Gentile | 160/236 |
| 2,381,542 A | * | 8/1945 | Hyatt et al. | 442/148 |
| 3,319,695 A | | 5/1967 | Houmere | 160/168 |
| 5,553,653 A | | 9/1996 | Rozon | 160/173 |
| 5,680,891 A | * | 10/1997 | Prince | 160/84.05 |
| 5,691,031 A | * | 11/1997 | Swiszcz et al. | 428/116 |
| 5,797,442 A | | 8/1998 | Colson et al. | 160/236 |
| 5,918,655 A | * | 7/1999 | Corey | 160/84.05 |
| 6,019,864 A | | 2/2000 | Jones | 156/258 |
| 6,206,075 B1 | * | 3/2001 | Prince et al. | 160/84.05 |
| 6,630,222 B1 | * | 10/2003 | Fay et al. | 428/118 |

FOREIGN PATENT DOCUMENTS

| | | |
|---|---|---|
| DE | 29904993 | 7/1999 |
| DE | 19805272 | 12/1999 |
| GB | 2163372 | 2/1986 |
| JP | 1-73297 | 5/1989 |

* cited by examiner

*Primary Examiner*—David Purol
(74) *Attorney, Agent, or Firm*—Dorsey & Whitney LLP (57) ABSTRACT

A slat or vane (30) for use in a covering for an architectural opening is suitable for use in either a horizontal or vertical orientation and in a horizontal orientation will not sag or droop, and in a vertical orientation will rotate uniformly along its length when rotated from end thereof. The slat (30) is formed in a tubular configuration and has a base material of glass fibers bonded together in a thermoformable resin so as to maintain the arcuate curvature desired for the tubular slat or vane (30). The slat (30) can be repeatedly deformed and will always return to its original configuration.

50 Claims, 10 Drawing Sheets

TUBULAR SLAT FOR COVERING FOR ARCHITECTURAL OPENINGS

CROSS REFERENCE TO RELATED APPLICATIONS

This application claims priority to U.S. provisional application No. 60/219,039 filed on Jul. 18, 2000.

BACKGROUND OF THE INVENTION

1. Field of the Invention

The present invention relates generally to slats for use in horizontal or vertical coverings for architectural openings and, more particularly, to such a slat that has been formed in a transversely compressible tubular configuration.

2. Description of the Relevant Art

Coverings for architectural openings have been in use for centuries and have assumed many different forms. For years fabrics were simply draped across architectural openings such as windows, doors, archways and the like, but subsequently more sophisticated coverings have emerged. For example, pleated draperies have been in use for some time and can be moved with conventional hardware between an extended position across an architectural opening and a retracted position adjacent the sides of the opening.

Another popular form of covering is a Venetian blind which consists of a plurality of horizontally disposed wooden or aluminum slats and, more recently, plastic slats that are supported at spaced locations along their length by ladders. The ladders, which may be tape ladders or cord ladders, consist of parallel but spaced vertically extending flexible fabric tapes or cords having a plurality of slat supporting cross-ladders or rungs extending therebetween at vertically spaced locations. The slats are supported on the cross-ladders. Lift cords extend vertically through the slats and appropriate control mechanisms are provided so that the lift cords can be raised thereby gathering or accumulating the slats into a stacked relationship when the covering is moved from an extended position across the architectural opening to a retracted position adjacent the top of the architectural opening. Further, by shifting the parallel tapes, cables or cords of the ladders in opposite vertical directions, the cross-ladders are tilted thereby tilting the slats so as to move the Venetian blind between open and closed positions to selectively permit the passage of vision and light between the slats.

More recently, coverings for architectural openings have included vertical blinds which are similar to Venetian blinds except the slats are disposed vertically rather than horizontally. Like Venetian blinds, the slats can be pivoted about their longitudinal axes to move the covering between open and closed positions. The slats, as a group, can also be extended or retracted across the architectural opening.

Even more recently, designer coverings for architectural openings have included cellular blinds wherein interconnected cells of material extend across the architectural opening and can be collapsed upon themselves when opening or closing the covering or moving it between extended and retracted positions.

While slats or vanes that are used in Venetian blinds or vertical blinds have traditionally been made of a rigid hard material, attempts have been made at softening the appearance of such slats or vanes, with examples of such being disclosed in U.S. Pat. Nos. 5,797,442, 5,960,850 and 5,876,545, which are commonly owned with the present application. In the aforenoted patents, the vanes have been suspended vertically and formed in a tubular configuration, with the tubular configuration substantially eliminating torque along the length of the vane so that when the vane is rotated at its upper end by a control mechanism, the lower end of the vane will move in unison therewith. A characteristic of the tubular vanes in the aforenoted patents, however, is that they are easily bendable along their length so that if disposed horizontally, they will droop or bend.

While tubular vanes have been employed in Venetian blinds, they have suffered from various drawbacks.

There is a need in the art of coverings for architectural openings for a tubular slat or vane that presents a softer appearance than hard wood, plastic or aluminum slats and the like, but which will also retain its shape whether or not disposed horizontally or vertically. Furthermore, there is a need for slats that have a high degree of translucency, wherein a maximum amount of diffused light is transmitted through the shade.

SUMMARY OF THE INVENTION

The present invention concerns a tubular slat or vane that can be used in horizontal or vertical coverings for architectural openings and wherein the vane presents a soft fabric appearance while retaining structural rigidity along its length. The vane can, therefore, be used in Venetian blinds or vertical blinds and when used in a Venetian blind will not noticeably sag along its length, and when used in a vertical blind will rotate uniformly along its length without helically twisting.

The tubular vane can be made from various combinations of materials but in the preferred embodiments, the base structural component of the material is a fiberglass matting wherein the fibers might be woven, non-woven or randomly oriented but united with a thermoformable resin so that the matting has deformable memory. In other words, it can be formed under the application of heat into any desired configuration which it will yieldingly maintain. It is resilient so as to always return to that configuration even after having been temporarily deformed.

Preferably, but not necessarily, the fiberglass matting has a layer of additional fabric or other material which is either laminated to or wrapped over the fiberglass matting to give the slat the desired texture and/or aesthetic appearance, but the fiberglass matting will present and retain the structural qualities desired for the slat so that they will withstand extreme environments which the slats encounter during shipment and use such as the compression and deformation of the slats.

While the slats are formed into a tubular configuration, there are a number of tubular configurations available.

Other aspects, features and details of the present invention can be more completely understood by reference to the following detailed description of the preferred embodiments, taken in conjunction with the drawings and from the appended claims.

DESCRIPTION OF THE PREFERRED EMBODIMENT

The slat or vane 30 for use in a covering for an architectural opening in accordance with the present invention is probably seen best in FIGS. 1–4 to comprise an elongated tubular body 32 having upper and lower outwardly convex side walls 34 and 36, respectively, a folded edge 38 and a secured edge 40. As will be described in more detail later, the slat is formed from a strip of material having opposite ends by folding the material longitudinally along a line proximate the centerline of the strip and securing the free ends together in overlapping relationship. The slat can be cut to any desired length either before or after formation of the tube. An important feature of the invention resides in the material from which the vane is made inasmuch as it is desired that the slat, under normal use conditions, maintains its tubular configuration and is capable of returning to that tubular configuration even after having been deformed or transversely compressed such as in extreme environments encountered in shipment and day-to-day use in architectural openings. An important component of the material is a fiberglass web which can be woven, non-woven or composed of randomly oriented glass fibers which are held together in a suitable resin. The preferred glass material is manufactured by Ahlstrom of Karhula, Finland and designated as product #GFT-51G10-50. It is a non-woven glass fiber tissue that has weight of 50 grams per square meter. In one embodiment, a thermoset resin is added to the glass non-woven at the time of manufacture at a level of 21 to 24% by dry weight. It is to be appreciated that high or lower amounts of resin can be utilized depending on the properties of the resin and the fiberglass. This resin which is added to the glass mat is only dried at the point of manufacturing. This allows the subsequent user the ability to place the glass tissue within a form and heat it to its cross-linking temperature and dwell time. After the heating process, the resulting glass mat and thermosetting resin construction will maintain its shape indefinitely. The diameter of the glass fibers within the tissue is extremely small (11 microns). Along with its optical clarity, the glass fibers give the glass tissue, when observed with transmitted light, the desired amount of translucency as compared with other textile fibers which are relatively opaque when observed in the same condition of transmitted light. The thermosetting resin used to bind the glass fibers is a thermoformable resin so that the orientation of the fibers and the material in which they are disposed remain somewhat constant, even though flexible, until the set orientation is modified or changed by heating the material to a predetermined temperature in excess of the setting temperature of the resin. In other words, the fiberglass material formed with the thermoformable resin can be heated to a predetermined temperature and then molded into a predetermined configuration and after cooling will retain that configuration.

While a slat 30 made from such a fiberglass material can be formed solely from the matting of fiberglass and resin, for aesthetic or other reasons, it may be desirable to laminate a different material to the fiberglass matting. Materials such as most any fabric, foil or the like can be laminated to the fiberglass material so that once the vane is formed, the different material, located on the exterior or interior surfaces of the tubular slat, gives the slat or the vane a desired appearance.

Figure 24:
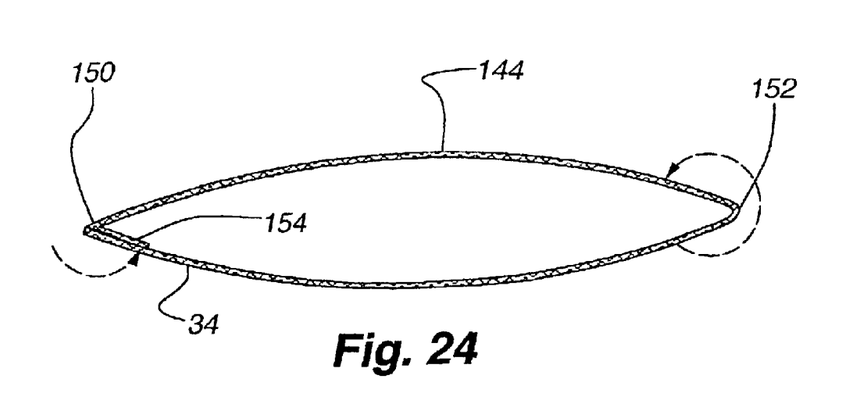
FIG. 24 is an enlarged view of a second embodiment of a slat formed from the strip of material shown in FIG. 23.

As can be seen in FIGS. 1–4, slat 30 has a flap or external tail portion 142, wherein the walls 34 and 36 are secured together to form the slat. In an alternative embodiment slat 144 as best shown in FIG. 24, no external tail portion is produced. In the alternative slat 144, one edge of one of the walls is folded inwardly to meet the inside surface of the other wall, wherein the folded in portion is adhesively joined to the corresponding inside surface.

Figure 1:
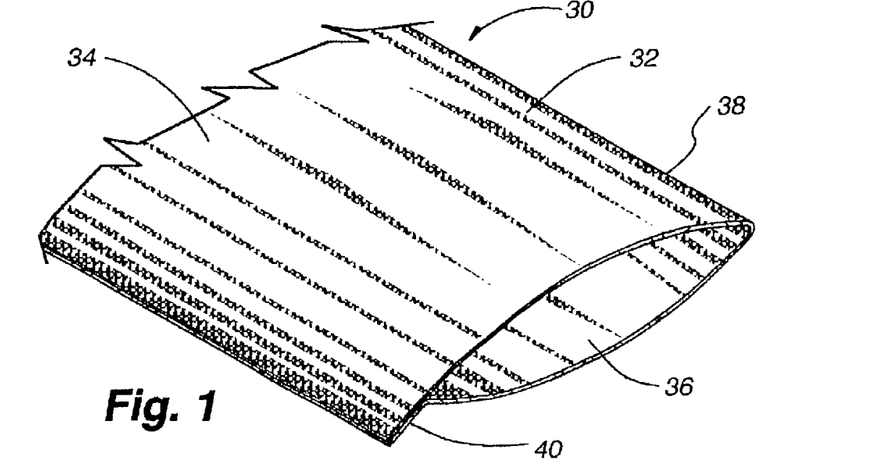
FIG. 1 is a fragmentary isometric view of a slat formed in accordance with the present invention looking downwardly on the slat.
Figure 2:
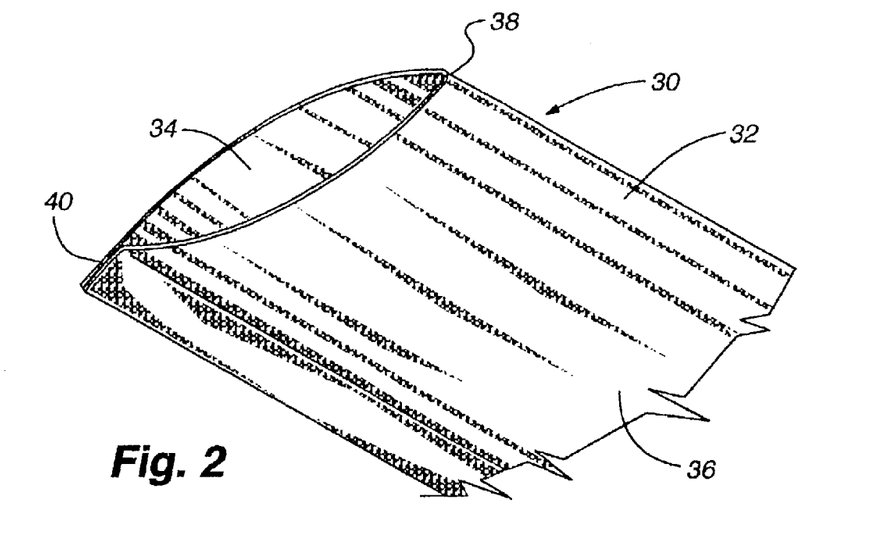
FIG. 2 is a fragmentary isometric similar to FIG. 1 but looking upwardly at the slat.
Figure 3:
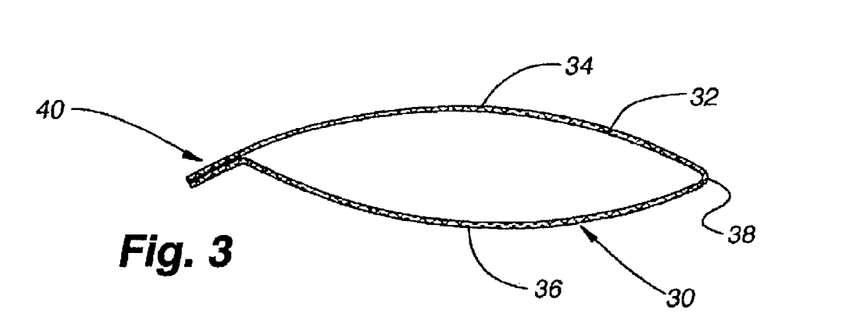
FIG. 3 is an end elevation of the slat shown in FIGS. 1 and 2.
Figures 4, 7, 8:
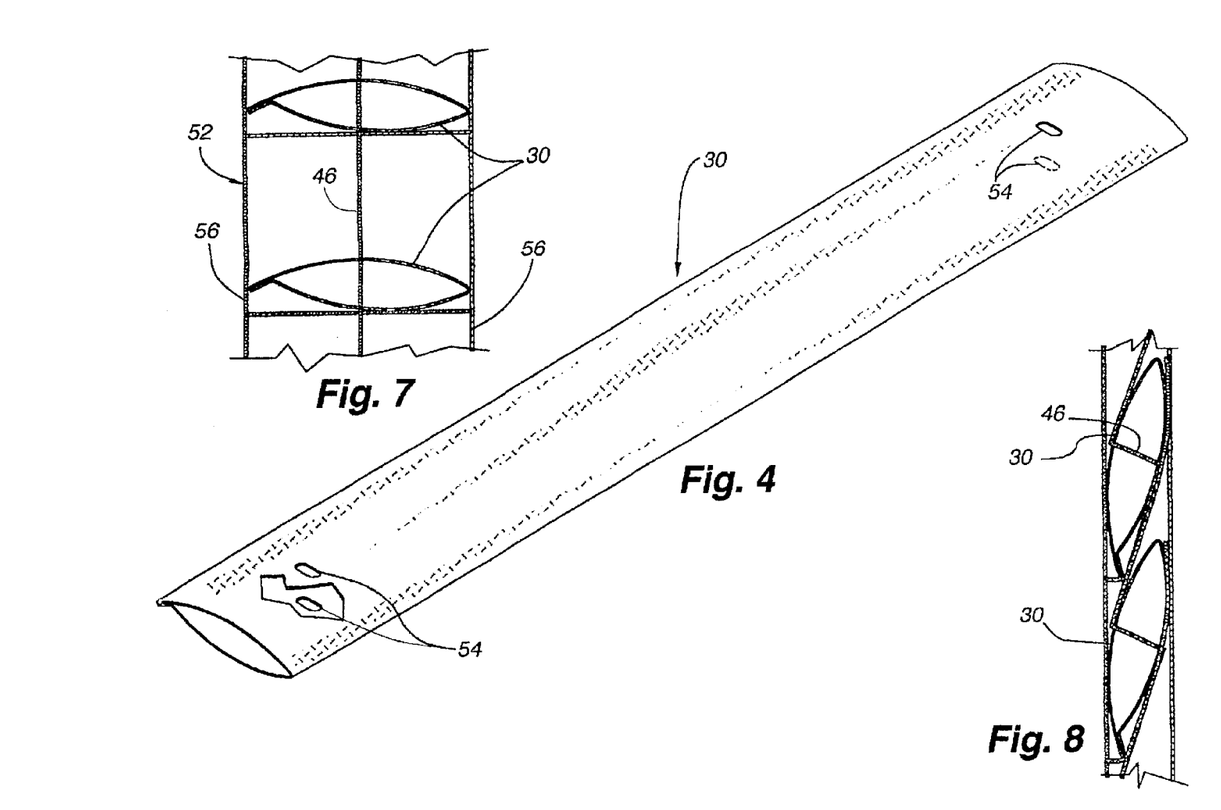
FIG. 4 is an isometric view of the vane shown in FIGS. 1 and 2 with parts thereof removed for clarity.
FIG. 7 is a further enlarged fragmentary end elevation of a portion of the blind shown in FIG. 6.
FIG. 8 is a fragmentary end elevation of the blind of FIG. 5 with the slats rotated into a closed position.
Figures 5, 6:
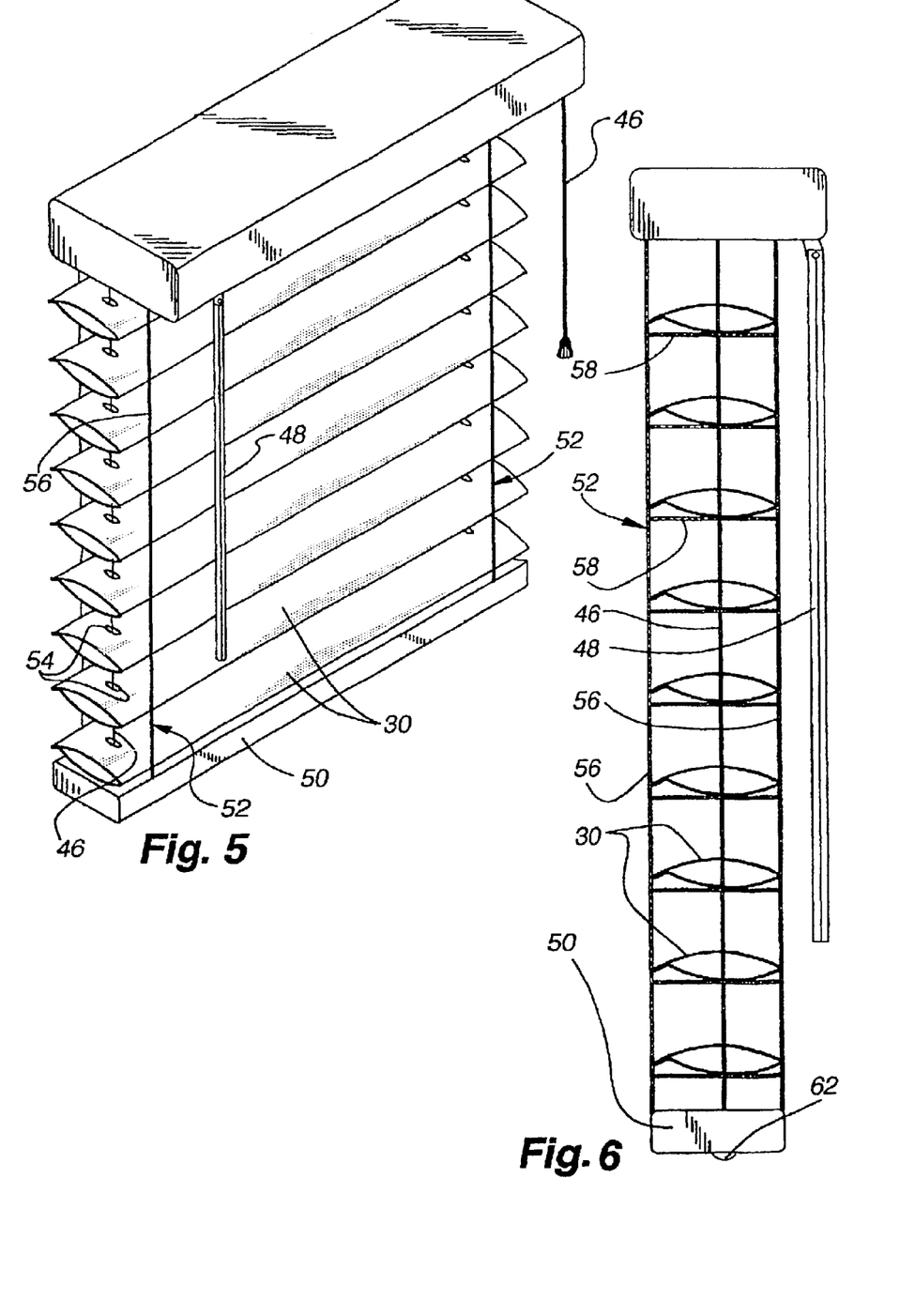
FIG. 5 is an isometric view of a Venetian blind incorporating the slat of the present invention and with the blind in an open and extended position.
FIG. 6 is an enlarged end elevation of the blind as shown in FIG. 5.
Figure 9:
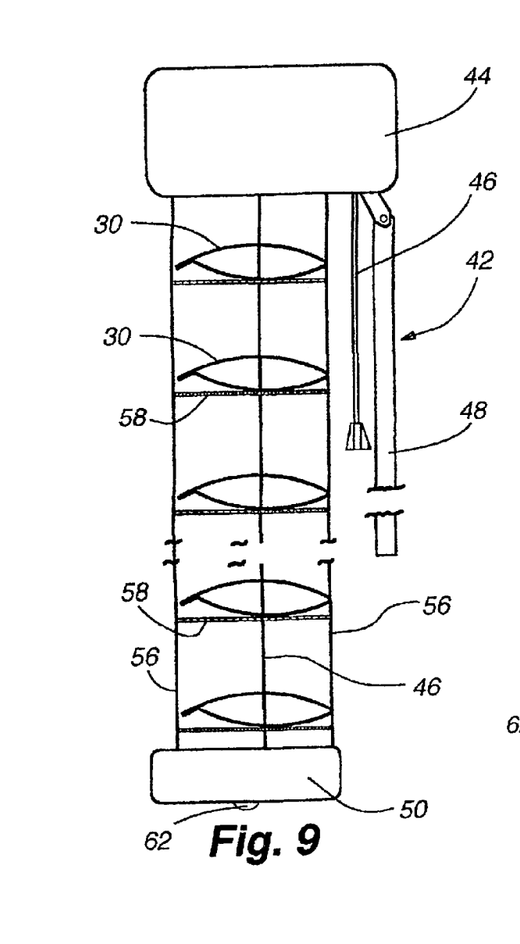
FIG. 9 is an end elevation similar to FIG. 6 which has been further enlarged and with parts removed for clarity and with the slats shown in an open position.
Figure 10:
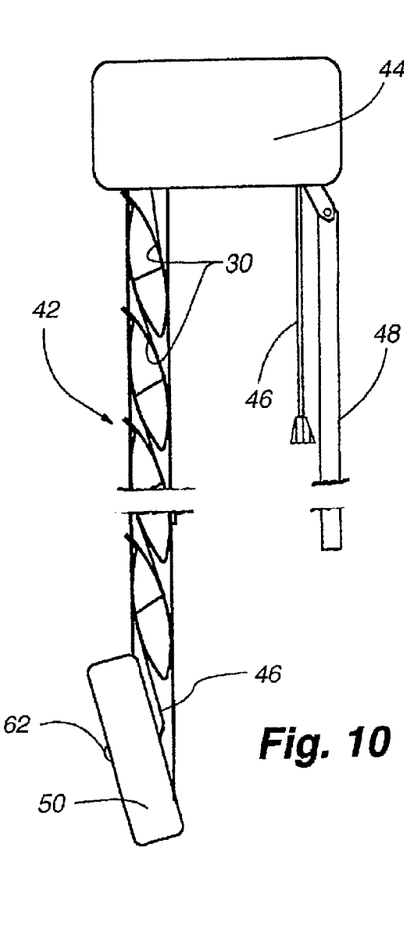
FIG. 10 is an end elevation similar to FIG. 9 with parts removed for clarity and with the slats in a closed position.
Figure 11:
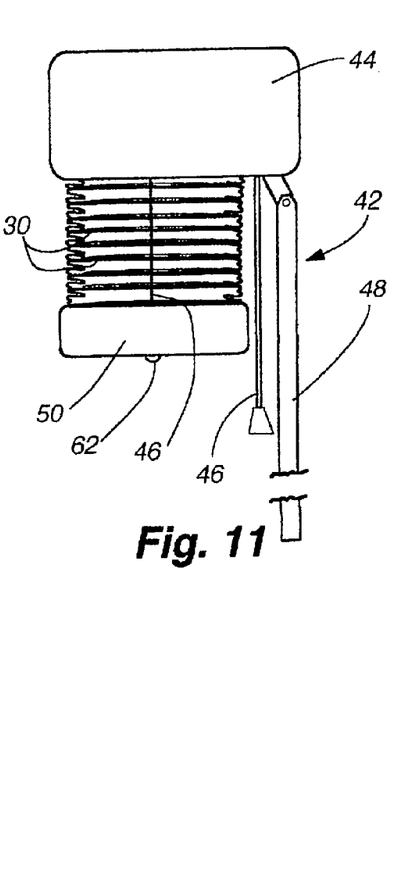
FIG. 11 is an end elevation of the blind of FIG. 5 with parts removed for clarity and with the blind in a retracted position.
Figure 12:
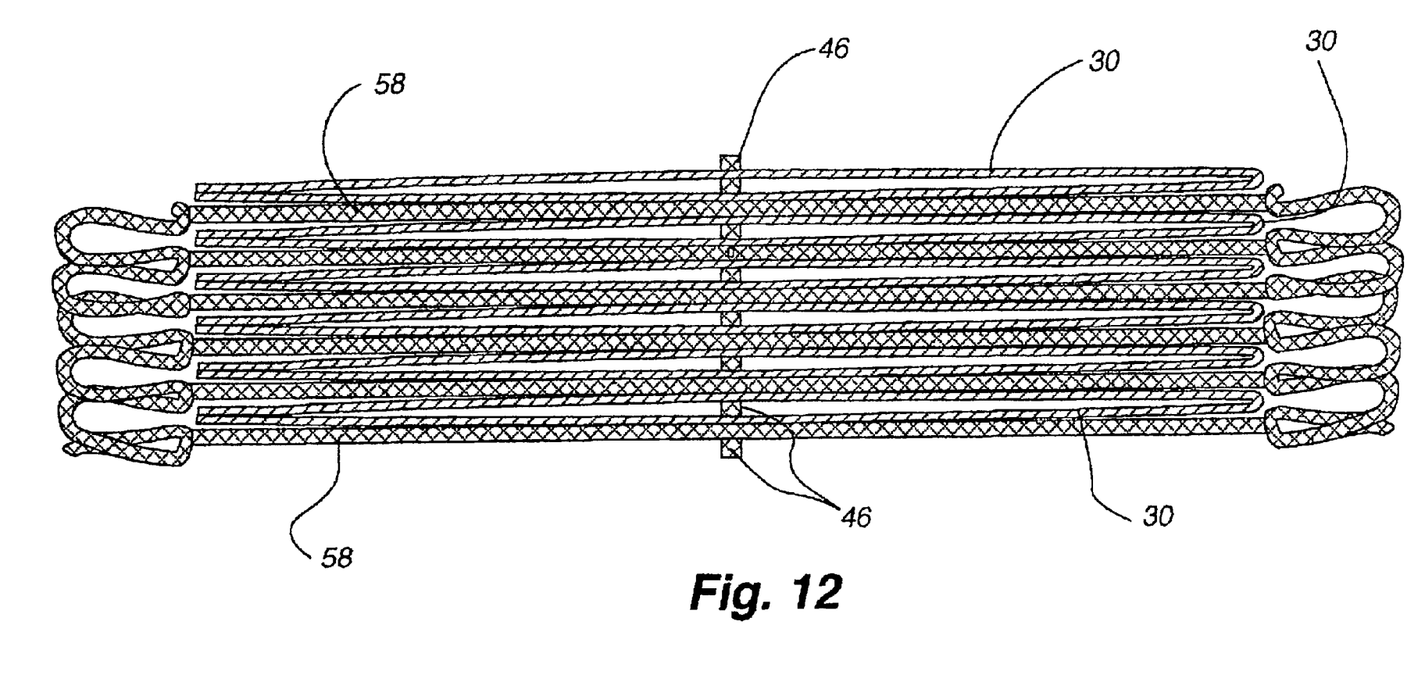
FIG. 12 is an enlarged end elevation of a plurality of slats in accordance with the present invention shown supported by a cord ladder and with the slats in a retracted position.

With reference to FIGS. 5–11, the slat 30 is shown incorporated into a Venetian blind-type covering 42 for an architectural opening wherein the Venetian blind has a headrail 44 in which the control system for the blind is disposed, a lift cord 46, a tilt wand 48, a bottom rail 50 spaced from but parallel to the headrail and cord ladders 52 at opposite ends of the blind. Each tubular slat 30 has been provided with aligned openings 54 in the side walls thereof adjacent to the ends of the slats so as to accommodate the incorporation of the slats into the blind system. The cord ladders, as probably best seen in FIGS. 6–8, have two vertically extending spaced tilt cords 56 with horizontal rungs 58 connecting the tilt cords at equal vertically spaced locations. Each rung supports an end of a slat so that the slats are disposed in a parallel horizontal orientation. The lift cords 46 extend through the vertically aligned openings 54 at the ends of each slat and are knotted or otherwise affixed at 62 beneath the base rail as best seen in FIGS. 6–11. As seen in FIG. 12, when the blind is retracted, the vertical tilt cords 56 are folded along opposite edges of the slats with the rungs 58 of each cord ladder extending between slats. In the retracted position of FIG. 12, the slats can be seen to still be tubular, but they are compressed into a very shallow tube so as to occupy minimal space. In that manner, the slats can be compressed into a very small space, which is actually smaller than the space occupied by wooden slats conventionally found in Venetian blinds.

Slats 30 can also be used in other types of Venetian blinds that utilize a lift cord that extends along the outside of the blinds, typically interwoven with the vertical portion of the cord ladder. In this type of Venetian blind, no openings need be made in the surface of the slat that can allow light to pass unimpeded therethrough when the blind is in the closed position. It is appreciated that these slats may also be compressed when the blind is retracted in a similar manner as illustrated in FIG. 12. The use of the tubular slats with external lift cords are described in greater detail in two co-pending United States patent applications that are owned by the assignee of the present application entitled "Shutter Type Covering For Architectural Openings" (patent application Ser. No. 60/305,947, filed on Jul. 16, 2001) and "Ladder Operated Covering With Fixed Vanes For Architectural Openings" (Patent application Ser. No. 60/258,158 filed on Dec. 12, 2000), which are both hereby incorporated herein by reference in their entirety.

Figure 13:
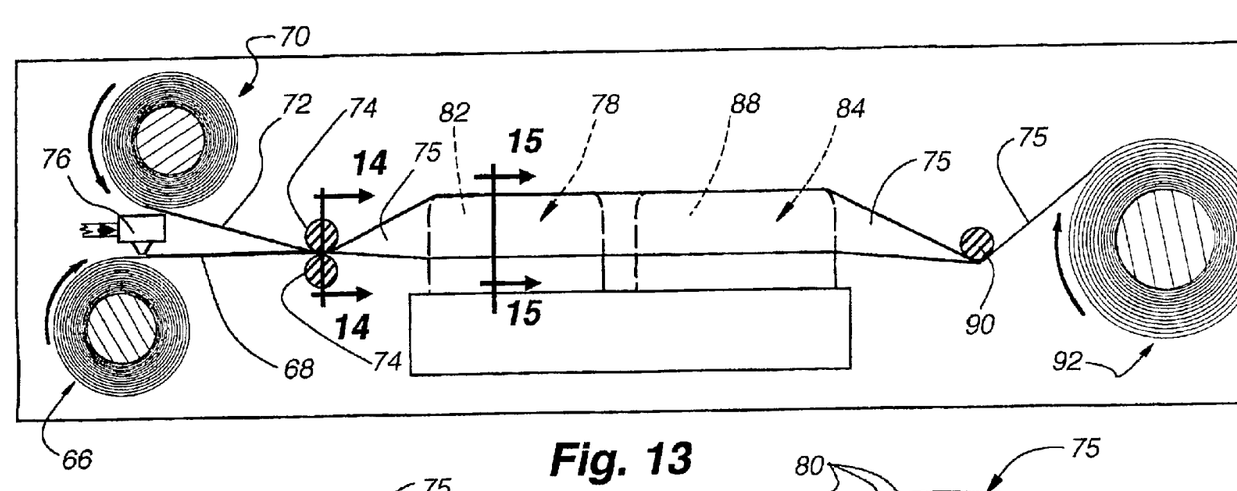
FIG. 13 is a diagrammatic view of a process for forming the material from which a slat can be formed.
Figure 14:
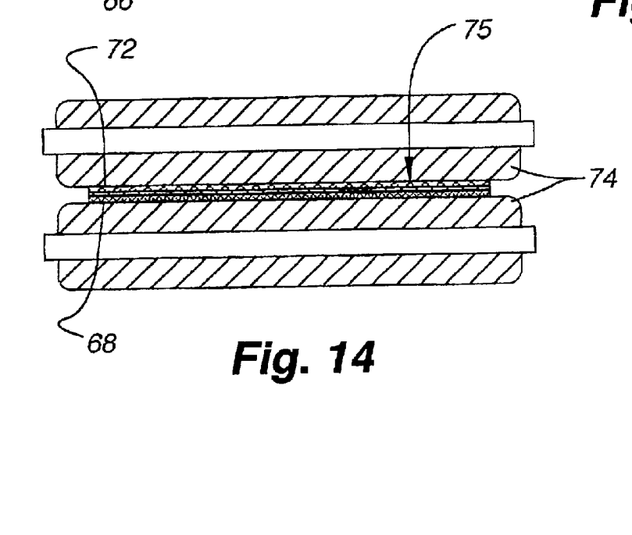
FIG. 14 is an enlarged diagrammatic section taken along line 14—14 of FIG. 13.
Figure 15:
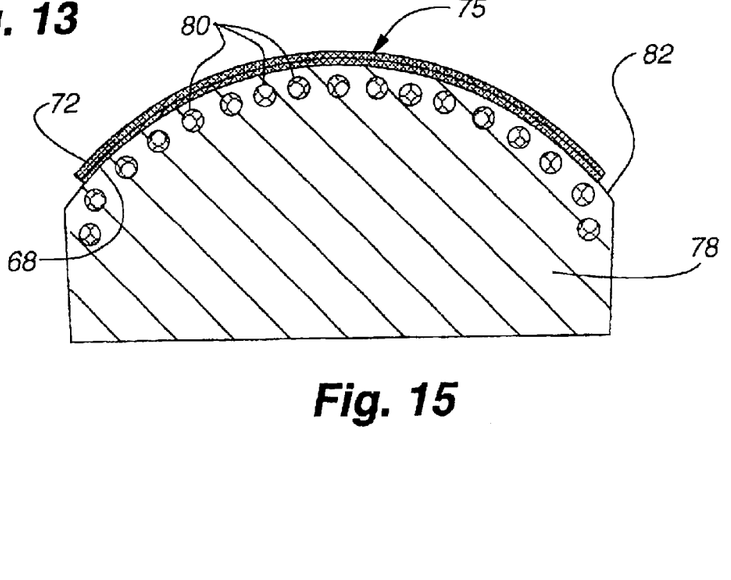
FIG. 15 is an enlarged diagrammatic section taken along line 15—15 of FIG. 13.

As mentioned previously, the fiberglass/resin matting material used in the slats can be used alone, but for aesthetic or other reasons, a separate material can be laminated to the base fiberglass/resin material or wrapped around the base material. With reference to FIG. 13, a forming apparatus 64 and process for forming a strip material from which the slats 30 can be formed is illustrated. At one end of the apparatus, a supply roll 66 of a long strip of fiberglass/resin matting 68 is provided with the matting having a width substantially double that of the width of the proposed slat to be made from the material. The strip of fiberglass matting is positioned beneath a second roll 70 of an elongated strip of fabric or other material 72 which is to be laminated to the fiberglass matting 68. Free ends of the rolls of fiberglass and fabric strips are passed between a pair of confronting compression rollers 74 after a layer of adhesive has been applied to the top surface of the fiberglass matting with a conventional adhesive applicator 76. The adhesive could be any suitable adhesive having properties such as a thermoplastic or thermoset adhesive which tack bonds the fiberglass material 68 to the fabric material 72 as they are passed between the rollers 74. In one embodiment, no additional adhesive is applied with the thermoformable adhesive of the fiberglass matting being utilized to tack bond the fabric to the matting. Upon leaving the compression rollers, the laminate 75 is drawn over a first heated mandrel 78, which could be steel, aluminum or any suitable material, having longitudinally extending passages 80 therein adjacent to an arcuate upper surface 82 thereof. Heating fluids are passed through the passages to maintain the arcuate upper surface at a predetermined temperature in excess of the setting temperature of the thermoformable resin used in the fiberglass material and the adhesive 76. A section taken through the mandrel 78 with the laminate thereon is seen in FIG. 15. As the material is drawn across the heated mandrel, the thermoformable resin in the fiberglass material is rendered fluid so that the cross-direction of the laminate assumes the arcuate configuration of the top surface 82 of the mandrel. The laminate 75 leaving the downstream end of the heated mandrel 78 crosses over a cooling mandrel 84 of the same structure as the heating mandrel except that in the cooling mandrel coolant is passed through longitudinal passages (not shown) to retain the arcuate top surface 88 of the cooling mandrel at a preselected temperature beneath that of the heating mandrel and such as to set the thermoformable resin. The laminate leaving the downstream end of the cooling mandrel is, therefore, configured in a transverse arcuate shape and is passed around an idler roller 90 onto a take-up roller 92 where a predetermined length of the arcuate laminate strip is accumulated. While the cross-sectional configuration of the laminate may be temporarily deformed on the take-up roller 92, once the strip of laminate material is removed from the roller, it will again assume the arcuate configuration it had before it was wrapped onto the take-up roller.

Figure 16:
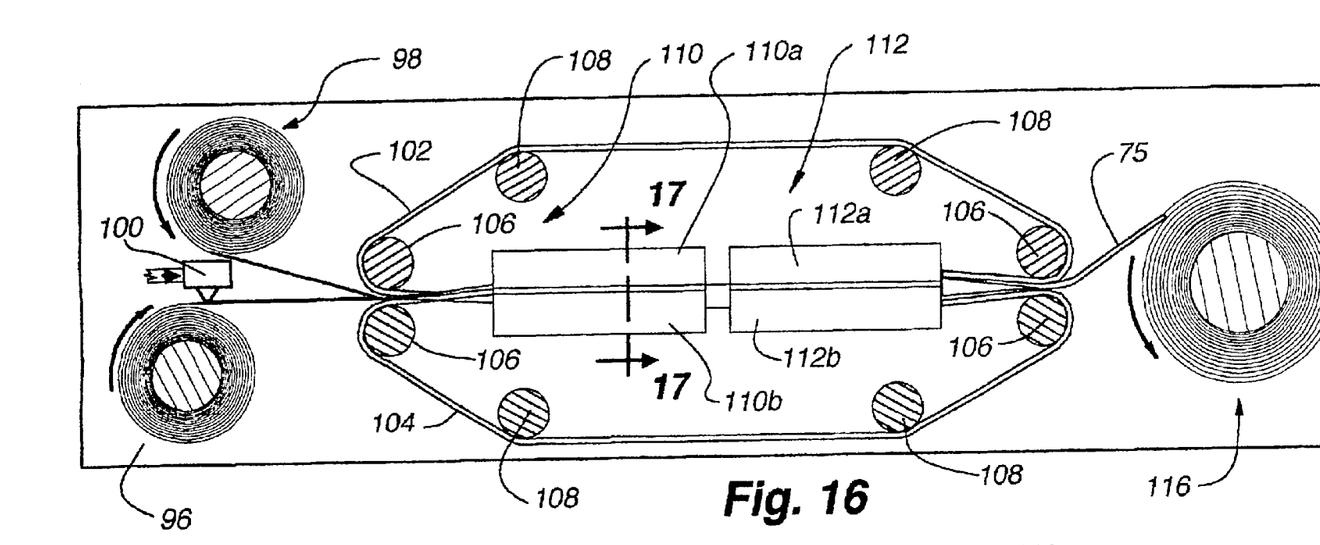
FIG. 16 is a diagrammatic view of a second system for forming the material from which a slat can be made.
Figure 17:
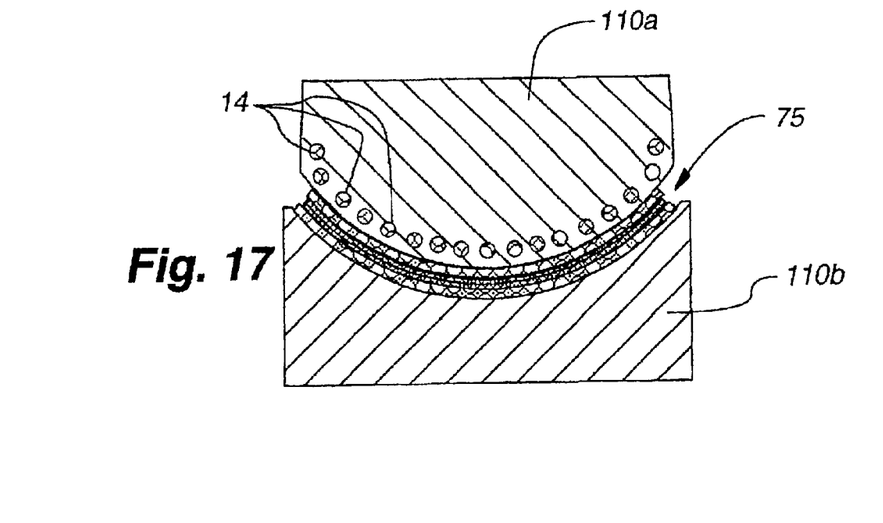
FIG. 17 is an enlarged diagrammatic section taken along line 17—17 of FIG. 16.

With reference to FIGS. 16 and 17, an alternative system 94 for forming the laminate strip 75 of material from which the slats can be formed is illustrated. As seen in FIG. 16, a strip roll 96 of fiberglass/resin material is disposed beneath a strip roll 98 of a fabric or other chosen material and a conventional adhesive applicator 100 is positioned therebetween to dispense a layer of adhesive onto the top surface of the fiberglass/resin material. Again, the adhesive could be any suitable adhesive but preferably a thermoplastic adhesive. A pair of upper and lower endless belts 102 and 104, respectively, are positioned downstream from the supply rolls of fiberglass and fabric with the endless belts being wrapped around driven 106 and idler 108 rollers in a conventional manner. Positioned between the upper and lower endless belts is a heating mandril 110 and a downstream cooling mandril 112, each mandril having an upper component 110a, 112a respectively and a lower component 110b, 112b respectively. The confronting faces of the upper components and lower components are convex and concave respectively and are spaced a predetermined distance to allow the free passage of the laminate therebetween. The upper component 110a, 112a of the heating and cooling mandrils, respectively, have elongated passages 114 adjacent to the convex surface thereof for the passage of heating and cooling fluids respectively so that the adjacent convex surfaces of the mandrils are retained at predetermined temperatures. As the laminate is passed between the upper and lower mandril components of the heating mandril 110, it is confined in an arcuate configuration and the temperature reaches a temperature that cross links the thermoset resin. An optimum temperature/time duration is believed to be approximately 410° F. for one minute with the Ahlstrom glass material identified above. That same arcuate configuration is maintained in the laminate as it passes through the cooling mandril 112 where the temperature is dropped beneath the temperature in the heating mandril which retains the arcuate transverse cross-sectional configuration of the laminate 75 as it leaves the downstream end of the cooling mandril and is wrapped onto a take-up roller 116. As mentioned with regard to the system illustrated in FIG. 13, while the transverse cross-sectional configuration of the laminate 75 might be deformed or changed temporarily while on the take-up roller, once it is unrolled, it will again assume the arcuate configuration imparted thereto as it passed through the heating and cooling mandrils.

Figure 18:
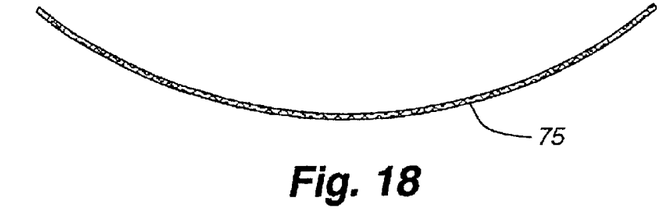
FIG. 18 is an end elevation of the material from which a slat can be formed after the material has been assembled according to the apparatus shown in FIGS. 13 or 16.
Figure 19:
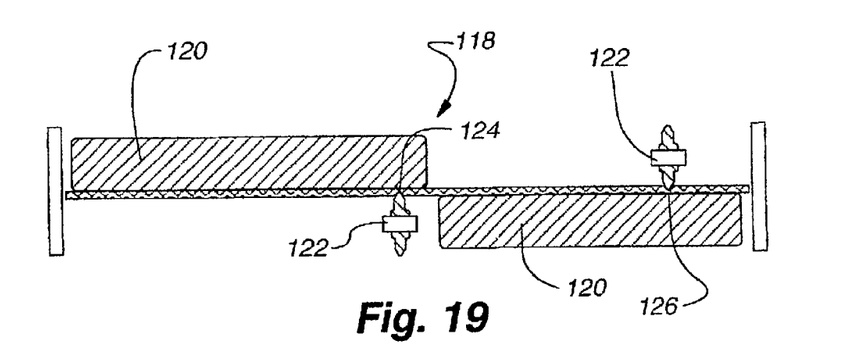
FIG. 19 is a diagrammatic end elevation showing a system for creasing the material from which a slat is to be formed.

FIGS. 18–22 illustrate how the arcuate laminate 75 is formed into the tubular slat. In FIG. 18, the arcuate laminate is shown in an end view in the same arcuate configuration it has after leaving the cooling mandril 112 of the forming apparatus of either FIG. 13 or 16. The laminate strip is first passed through a creasing apparatus 118 as illustrated in FIG. 19. In passing through the creasing apparatus, the strip of material is temporarily flattened so as to lie above and below a pair of juxtaposed anvils 120 and between the anvils and creasing rollers 122 which have been positioned at predetermined locations relative to the strip. The locations of the creasing rollers are determined by where the laminate strip 75 will ultimately be folded into the desired tubular configuration. In the disclosed embodiment of the slats, as will be appreciated in FIG. 19, one crease 124 is positioned at approximately the longitudinal center of the strip on one face of the strip while another crease 126 is placed adjacent to one side edge of the strip on the opposite face. It is not critically important on which side of the strip the creases are placed, but it has been found easier to crease the material while in a flat configuration, and in order to accomplish such, it is relatively simply to run the laminate strip between the anvils and crease rollers as illustrated.

Figure 20:
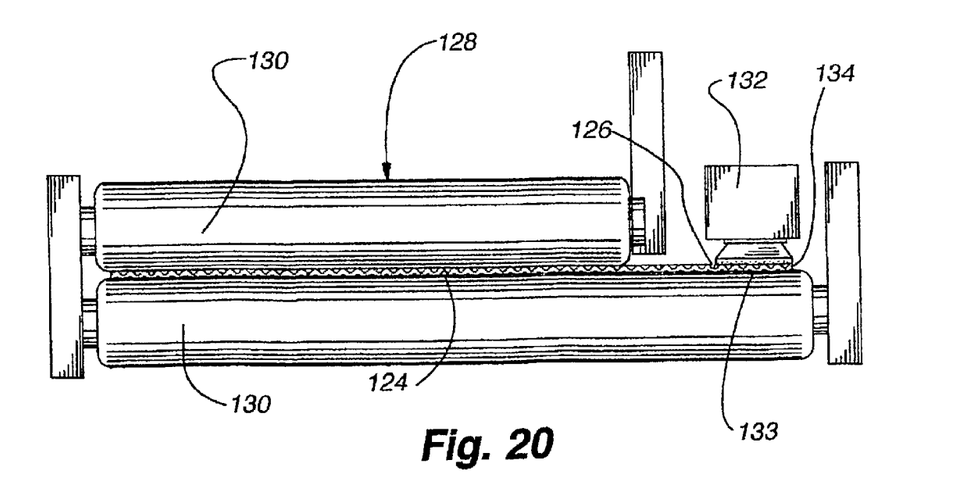
FIG. 20 is a diagrammatic end elevation showing a portion of the apparatus for preparing the slat material for formation into a tubular slat.

After having been creased, and as illustrated in FIG. 20, the laminate strip 75 is passed through an adhesive application device 128 which includes a pair of confronting rollers 130 which are spaced an adequate distance apart to allow the laminate strip to pass therebetween. The upper roller is shorter than the lower roller to allow space for a conventional adhesive applicator 132 which applies a strip of adhesive 133 to the top surface of the laminate strip between the crease 126 and the right edge 134 of the strip. The adhesive could be any suitable adhesive but preferably a thermoplastic copolyester adhesive such as Bostik 7183 made by Bostik Adhesives of Boston, Mass., or Griltex 6G made by EMS of Switzerland.

Figure 21:
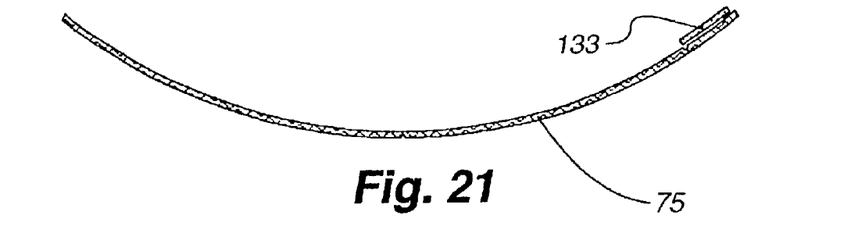
FIG. 21 is an end elevation of the slat material having a line of adhesive formed along one edge and with crease lines having been placed therein.

With reference to FIG. 21, after the laminate strip 75 emerges from the adhesive applicator, it again assumes its arcuate transverse configuration and it can then be passed through a folding mechanism (not shown) which takes the strip and folds it longitudinally along the crease 124 at the approximate longitudinal center of the strip so that the edges 134 and 138 of the strip are in overlying confronting relationship with the adhesive 133 therebetween. While the strip 75 is being folded along the approximate longitudinal centerline thereof, a flap 140 is formed by folding the edge 134 of the strip with the adhesive thereon about its associated crease 126 so that when the side edges of the laminate strip are in confronting relationship, the top wall 36 (which is shown on the bottom in FIG. 22) of the slat so formed retains it arcuate configuration and the flap 140 on the free edge of the bottom wall 34 (which is shown on the top in FIG. 22) of the slat conforms to the curvature of the top wall. At the location where the edges of the laminate strip are adhesively bonded, an external tail 142 is formed which can be passed through a heat setting apparatus (not shown) to secure the edges of the laminate strip thereby permanently forming the slat into the tubular configuration shown in FIG. 22.

Figure 22:
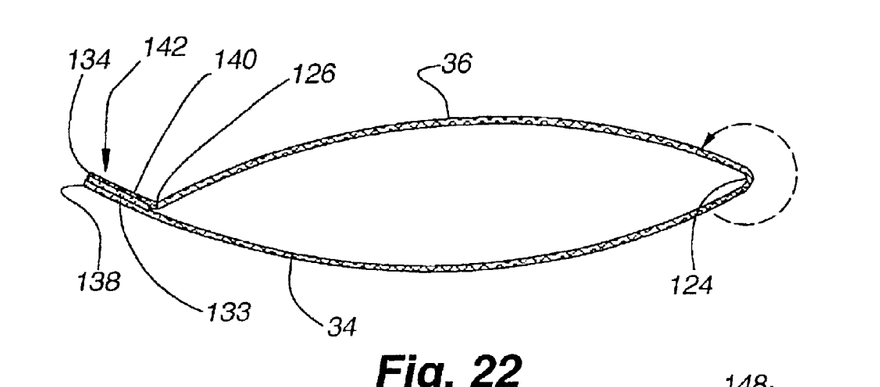
FIG. 22 is an enlarged end elevation of a slat formed with the strip of material illustrated in FIG. 21.
Figure 23:
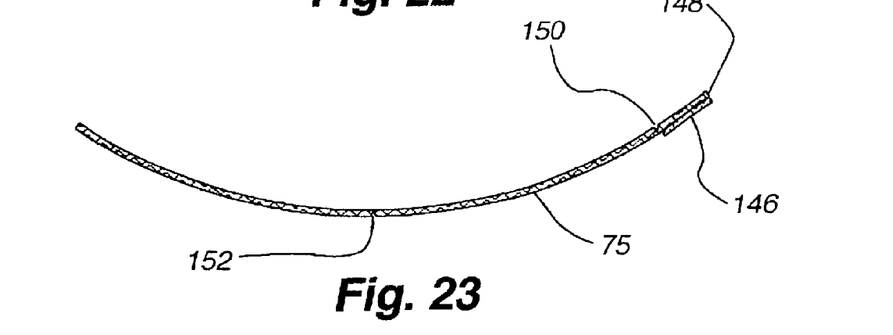
FIG. 23 is an end elevation of a strip of material from which a vane can be formed with the material having an adhesive strip on the opposite side from that shown in FIG. 21.

In an alternative embodiment 144 of the slat shown in FIG. 24, it is formed in a similar manner except that adhesive 146 (FIG. 23) is applied to the undersurface 148 of the laminate strip 75 between the right edge 148 of the strip and an adjacent crease line 150 and once the laminate strip has been folded about a crease 152 running substantially along the longitudinal center of the strip, a flap 154 defined between the right edge 148 of the strip and the adjacent crease line 150 can be folded inwardly to confront the top surface of the bottom wall 152 of the slat and, again, this location of the slat can be passed through a heat setting apparatus (not shown) to secure the free edges of the laminate strip together internally of the slat thereby forming a slat that does not have an external tail as in the slat of FIG. 22.

Figure 25:
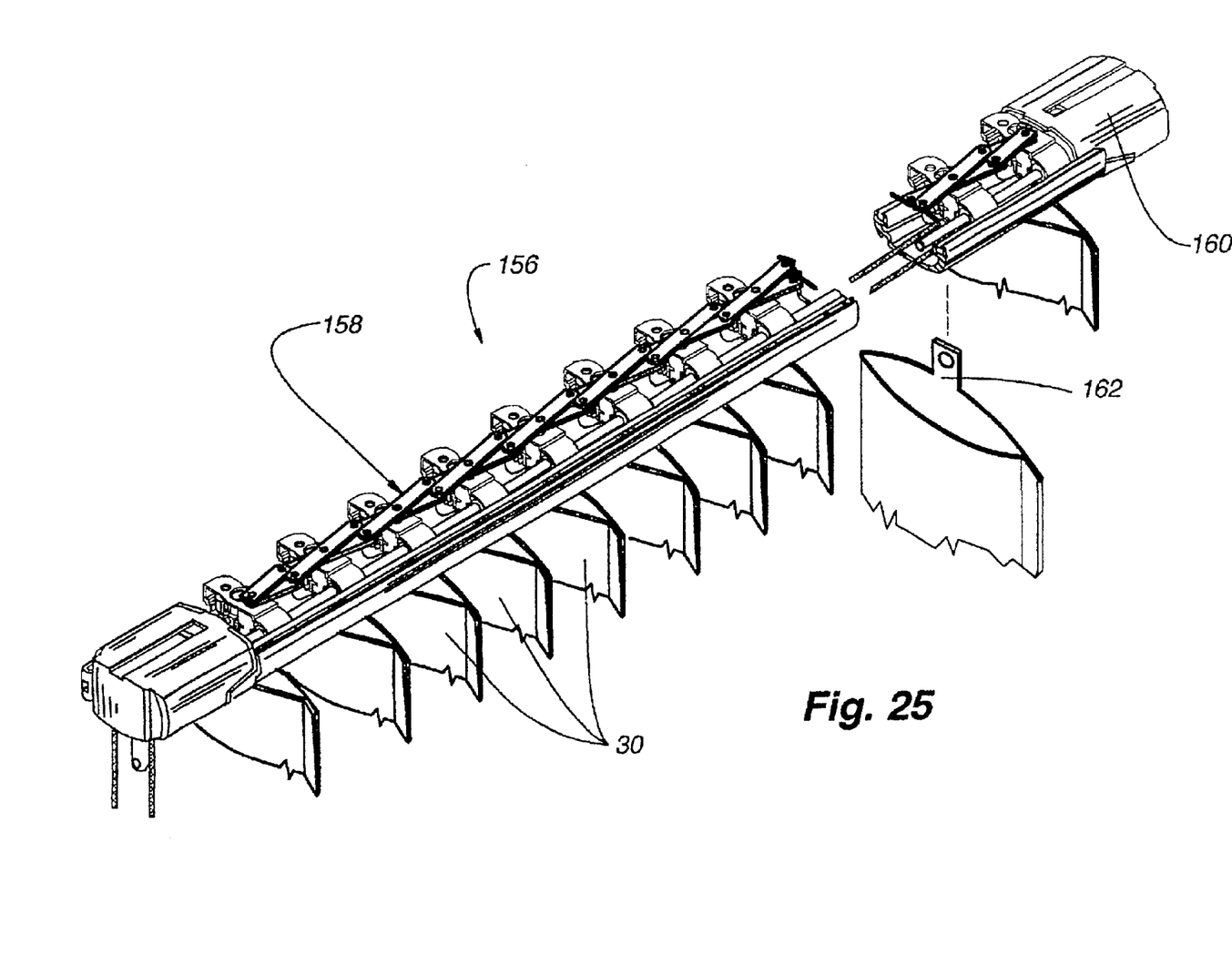
FIG. 25 is a fragmentary isometric view with parts removed of a control system for a vertical vane covering for architectural openings wherein the vanes have been formed in accordance with the present invention.

In FIG. 25, the slats 30 configured and as illustrated in FIG. 22 are shown disposed vertically in a vertical slat covering 156 for an architectural opening, the slats being suspended from a control mechanism 158 that is adapted to shift the slats longitudinally of a headrail 160 to extend or retract the covering and also rotate the slats about longitudinal vertical axes when opening or closing the covering. A vertical tab 162 has been formed in the end of the vane but in reality, it would be easiest to form the tab by adhesively securing a separate tab strip (not shown) to the open end of the tubular slat rather than forming the tab in the laminate strip from which the slat is formed.

Because of the optical properties of the fiberglass material, the resulting slats 30 or 144 are typically translucent. When a window covering using these slats is placed in its closed position, shadow lines are not produced on adjacent slats caused by the overlapping slat as the slats diffuse the light passing therethrough. Additionally, since the slats are hollow, as well as translucent, patterned and/or colored inserts can be inserted into the slats to change the resulting appearance of the slats as well as the slats level of translucency. In one type of window blind assembly, wherein the slats are used in window coverings in which the lift and ladder cords are routed outside of the vanes and do not pass through the vanes, the appearance changing inserts can be easily installed post production by consumers or window covering vendors.

A slat 30 or 144 formed in accordance with the present invention will not sag or droop noticeably along its length even when disposed horizontally and when provided in lengths commonly found in coverings for architectural openings due in large part to the tubular construction and the resin rigidified fiberglass mat. Furthermore, the vane or slat is suitable for use in a vertical covering. When used in a vertical covering will not "barber pole" or twist along its length so that when the vane is rotated at its upper end by a control system, the lower end will rotate in unison therewith. The material from which the slat or vane is manufactured is important to its functionality and through use of glass fibers and a thermosetting resin, the vane can be formed to have deformation memory whereby it will retain its tubular orientation under normal circumstances but can be deformed by compressing, folding or the like and will rebound to its original configuration due to the memory provided therein with the glass fibers and the thermoformable resin. The slat or vane so formed is thereby resilient and can be deformed repeatedly without losing the ability to return to its original configuration. This resiliency allows the slats to be compressed as shown in FIG. 12 when an associated blind assembly is retracted, and return to there undeformed configuration when the blind assembly is lowered.

Although the present invention has been described with a certain degree of particularity, it is understood that the present disclosure has been made by way of example, and changes in detail or structure may be made without departing from the spirit of the invention as defined in the appended claims.

What is claimed:

1. A slat for a covering for an architectural opening comprising in combination:
    an elongated tubular body formed from a material including glass fibers in a thermosetting resin which has been heated above its setting temperature whereby said body is flexible, resilient and will return to its original configuration after repeated deformations.

2. The slat of claim 1 wherein said material is a laminate including a first layer of glass fibers in said thermosetting resin and a second layer of a different material.

3. The slat of claim 2 wherein said first and second layers are bonded together.

4. The slat of claim 3 wherein said bonding is with a thermosetting adhesive.

5. The slat of claim 2 wherein said second layer is a fabric material.

6. The slat of claim 5 wherein said fabric material is woven.

7. The slat of claim 5 wherein said fabric material is non-woven.

8. The slat of claim 5, wherein said fabric material is a foil.

9. The slat of claim 1 wherein said slat is formed from a single strip of material having opposed edges that is folded along an approximate longitudinal centerline and the opposed edges are secured together.

10. The slat of claim 8 wherein said opposed edges are disposed exteriorly of the tube defined by said body.

11. The slat of claim 9 wherein said opposed edges are disposed interiorly of the tube defined by said body.

12. The method of forming a tubular slat for a covering for an architectural opening comprising the steps of:
    providing an elongated strip of material having opposed longitudinal edges, said strip including glass fibers in a thermosetting resin which has been heated above its setting temperature, folding said strip along an approximate longitudinal line so that said edges are in adjacent relationship, and securing said edges together.

13. The method of claim 12 further including the step of forming said strip with an arcuate transverse configuration before said folding step.

14. The method of claim 13 wherein said edges are secured together exteriorly of the tube defined by said slot.

15. The method of claim 13 wherein said edges are secured together interiorly of the tube defined by said slat.

16. The method of claim 13 wherein said edges are secured together with a thermosetting adhesive.

17. The slat of claim 1, wherein the tubular body comprises a upper side and a lower side, the lower side having downwardly convex outer surface, and the upper side having an upwardly convex outer surface, the upper side intersecting with the lower side along two opposing edges.

18. The slat of claim 17, wherein the upper and lower sides formed from a single strip of material having two ends, the two ends overlapping to form the tubular body.

19. The slat of claim 18, wherein one of the opposing edges is formed by a fold in the single strip of material.

20. The slat of claim 19, wherein the other of the opposing edges is formed by an overlap of the two ends.

21. A method comprising:
    providing a thin elongated strip having opposite longitudinal edges, the elongated strip comprising a fibrous mat and a thermosetting resin disposed in the fibrous mat;
    forming the elongated strip to have a resilient arcuate transverse configuration by cross linking said thermosetting resin contained with in the fibrous mat;
    folding the elongated strip along at least one longitudinal line; and joining the opposing longitudinal edges together to form a tubular body having a upwardly convex top surface and an opposing downwardly convex bottom surface; and heating the strip above its setting temperature.

22. The method of claim 21, wherein the fibrous mat comprises fiberglass.

23. The method of claim 22, wherein the fiberglass is non-woven.

24. The method of claim 21, wherein said folding the elongated strip along at least one longitudinal line further comprises folding the longitudinal strip along first and second longitudinal lines.

25. The method of claim 24, wherein the first longitudinal line is proximate the transverse enter of the strip between the opposing longitudinal edges, and the second longitudinal line is proximate one of the longitudinal opposing edges.

26. The method of claim 24, wherein said joining the opposing longitudinal edges together to form a tubular body further comprises:

overlapping a first portion of the elongated strip located between the first longitudinal edges, and a second portion of the elongated strip located between the second longitudinal line and the other of the opposing longitudinal edges; and bonding the first portion to the second portion with an adhesive.

27. The method of claim 26, wherein the adhesive is a thermoplastic copolyester.

28. The method of claim 21 further comprising applying a layer of material to a surface of the elongated strip prior to said forming the elongated strip.

29. The method of claim 28, wherein the layer of material comprises a woven fabric.

30. The method of claim 28, wherein the layer of material comprises a non-woven fabric.

31. A slat for an architectural covering comprising:

an upwardly convex first elongated side having left and right longitudinal edges; and a downwardly convex second elongated side having left and right longitudinal edges, the left and right longitudinal edges of the first side being coextensive with the left and right longitudinal edges of the second side;

wherein the first and second elongated sides are both comprised of a thin fibrous mat having a thermosetting resin disposed within the fibrous mat with the resin having been heated above its setting temperature such that the fibrous mat is resilient and flexible having configuration memory such that it will return to its original configuration after being deformed.

32. The slat of claim 31, wherein the first and second elongated sides are comprised of a single continuous piece of the fibrous mat, the single piece of fibrous mat having first and second ends and being folded along either the left or right edge of the first or second elongated sides.

33. The slat of claim 31, wherein the fibrous mat comprises fiberglass.

34. The slat of claim 31, wherein the fibrous mat is non-woven.

35. The slat of claim 31, wherein the resin is a thermoset.

36. The slat of claim 31, wherein the first longitudinally extending side further comprise a second layer of material, the second lay of material laminated to a surface of the fibrous mat.

37. The slat of claim 36, wherein the second layer of material comprises a fabric.

38. The slat of claim 37, wherein the fabric is woven.

39. The slat of claim 37, wherein the fabric is non-woven.

40. The slat of claim 36, wherein the fabric is laminated to the surface of the fibrous mat by an adhesive resin.

41. The slat of claim 40, wherein the adhesive resin is a thermoset.

42. The slat of claim 32, wherein the fold at the left or right edge is proximate a centerline between the first and second ends.

43. The slat of claim 32, wherein the first and second ends are joined together in an overlapping relationship.

44. The slat of claim 42, wherein the first and second ends are joined together in an overlapping relationship proximate the left or right edge opposite the fold.

45. The slat of claim 31, wherein the resin content of the fibrous mat is approximately 21% to 24% by weight.

46. The slat of claim 31, wherein the slat is translucent.

47. The slat of claim 1, wherein the thermosetting resin content of the material is approximately 21% to 24% by weight.

48. The slat of claim 1, wherein the slat is translucent.

49. The slat of claim 1, wherein the slat is disposed horizontally and does not noticeably droop or sag.

50. The slat of claim 31, wherein the slat is disposed horizontally and does not noticeably droop or sag.

* * * * *